(12) United States Patent
Shah et al.

(10) Patent No.: US 9,075,809 B1
(45) Date of Patent: Jul. 7, 2015

(54) METHODS AND SYSTEMS FOR APPLICATION CLUSTER VIRTUAL NODES

(75) Inventors: Sunil Shah, Fremont, CA (US);
Ynn-Pying A. Tsaur, Oviedo, FL (US);
Sudhir Subbarao, Karnataka (IN)

(73) Assignee: Symantec Corporation, Mountain View, CA (US)

( * ) Notice: Subject to any disclaimer, the term of this patent is extended or adjusted under 35 U.S.C. 154(b) by 1534 days.

(21) Appl. No.: 11/864,956

(22) Filed: Sep. 29, 2007

(51) Int. Cl.
*G06F 17/30* (2006.01)

(52) U.S. Cl.
CPC .... *G06F 17/30067* (2013.01); *G06F 17/30126* (2013.01); *G06F 17/30008* (2013.01)

(58) Field of Classification Search
CPC ............ G06F 9/4868; G06F 17/30067; G06F 17/30126; G06F 17/30008
See application file for complete search history.

(56) References Cited

U.S. PATENT DOCUMENTS

| | | | |
|---|---|---|---|
| 5,752,067 A * | 5/1998 | Wilkinson et al. | 712/16 |
| 5,918,229 A * | 6/1999 | Davis et al. | 705/27.1 |
| 6,892,205 B1 * | 5/2005 | Colrain et al. | 1/1 |
| 7,058,629 B1 * | 6/2006 | Colrain et al. | 1/1 |
| 7,113,938 B2 * | 9/2006 | Highleyman et al. | 1/1 |
| 7,120,650 B2 * | 10/2006 | Loy et al. | 1/1 |
| 7,194,488 B2 * | 3/2007 | Highleyman et al. | 1/1 |
| 7,203,700 B1 * | 4/2007 | Kumar et al. | 1/1 |
| 7,392,421 B1 * | 6/2008 | Bloomstein et al. | 714/4.4 |
| 7,444,335 B1 | 10/2008 | Colrain et al. | |
| 7,487,228 B1 * | 2/2009 | Preslan et al. | 709/219 |
| 7,571,439 B1 * | 8/2009 | Rabinovici et al. | 718/104 |
| 7,617,370 B2 * | 11/2009 | Jernigan et al. | 711/165 |
| 2004/0093358 A1 * | 5/2004 | Ito et al. | 707/200 |
| 2005/0283481 A1 * | 12/2005 | Rosenbach et al. | 707/10 |
| 2006/0064400 A1 * | 3/2006 | Tsukerman et al. | 707/2 |
| 2006/0282481 A1 * | 12/2006 | Zhou et al. | 707/204 |
| 2007/0038888 A1 * | 2/2007 | Kariv | 714/10 |
| 2007/0203944 A1 * | 8/2007 | Batra et al. | 707/104.1 |
| 2007/0220059 A1 * | 9/2007 | Lu et al. | 707/200 |
| 2008/0281938 A1 * | 11/2008 | Rai et al. | 709/209 |

OTHER PUBLICATIONS http://www.symantec.com/business/support/index?page=content &id=TECH52406; 2007; pp. 20-70, 330-380.*
http://docs.oracle.com/html/A96684_01/ofs_rep.htm; pp. 1-25.*
Non-Final Office Action Received in Related U.S. Appl. No. 11/932,216; Jan. 26, 2010.
Final Office Action Received in Related U.S. Appl. No. 11/932,216; Jun. 10, 2010.
Sunil Shah, et al; Methods and Systems for Performing Data Protection Operations; U.S. Appl. No. 11/932,216, filed Oct. 31, 2007.

\* cited by examiner

*Primary Examiner* — Apu Mofiz
*Assistant Examiner* — Jermaine Mincey
(74) *Attorney, Agent, or Firm* — ALG Intellectual Property, LLC

(57) ABSTRACT

A method for creating an application cluster virtual node. The method may comprise identifying a plurality of nodes associated with an application cluster. The method may also comprise creating a virtual node that is associated with each node in the plurality of nodes. The method may comprise providing a data protection server with access to at least one node in the plurality of nodes. The access may be provided through the virtual node. A computer-readable medium is also disclosed.

20 Claims, 7 Drawing Sheets

METHODS AND SYSTEMS FOR APPLICATION CLUSTER VIRTUAL NODES

BACKGROUND

In the age of digital information, both individuals and enterprises have come to rely on computing systems and the data they store in almost every aspect of life. Often, the data itself is much more valuable than the underlying hardware that stores the data. Thus, many enterprises and individuals take precautions to protect their data.

One way of protecting data is to backup data. A backup computing system may store a copy of the data as it existed at a previous instant in time. The backup copy of the data may be periodically updated. More frequent updates tend to increase the freshness of the data at the backup computing system.

At some point, the data at the primary computing system may become inaccessible or otherwise lost. For example, the data may become corrupted due to a system failure or viral infiltration. Software (such as the operating system, application, or drivers) needed to access the data may also be corrupted. Furthermore, hardware needed to access the data may become damaged. After a system failure, data may be restored by replacing any damaged hardware and then copying data from the backup computing system to the primary computing system.

Typically, software is backed-up using a data protection application. Data protection applications may not be optimized to backup data controlled or stored by an application cluster. For example, a data protection application may inadvertently backup multiple copies of the same data when backing up data associated with the application cluster. A data protection application may also fail to take advantage of various features of an application cluster.

SUMMARY

According to certain embodiments, a method may comprise identifying a plurality of nodes associated with an application cluster, creating a virtual node that is associated with each node in the plurality of nodes, and providing a data protection server with access to at least one node in the plurality of nodes. The access may be provided through the virtual node. In at least one embodiment, creating a virtual node may further comprise advertising an identification of each node in the plurality of nodes to the data protection server.

According to some embodiments, the step of creating a virtual node may comprise storing the identification of each node in a plurality of nodes at the data protection server. In some embodiments, the application cluster may comprise a clustered database. According to various embodiments, identifying the plurality of nodes may comprise detecting an instance of the application cluster, querying the instance to obtain and identify the application cluster, and querying the instance to obtain identification information of each of the nodes in the plurality of nodes.

In various embodiments, the method may further comprise using the identification information of each of the nodes to acquire a network address of each node in the plurality of nodes. According to certain embodiments, a database protection agent running on each node in the plurality of nodes may advertise a virtual node to the database protection server. In certain embodiments, each node in the plurality of nodes may be given simultaneous access to data associated with the application cluster. In certain embodiments, the providing may further comprise presenting an application cluster database under the virtual node. According to some embodiments, the method may further comprise disassociating a node from the virtual node when the node becomes unavailable.

According to certain embodiments, a computer-readable medium may comprise a first computer-executable instruction operable to identify a plurality of nodes associated with an application cluster. The computer-readable medium may also comprise a second computer-executable instruction operable to create a virtual node that is associated with each node in the plurality of nodes. The computer-readable medium may further comprise a third computer-executable instruction operable to provide a data backup server with access to at least one node in the plurality of nodes, the access being provided through the virtual node.

In certain embodiments, the application cluster may comprise a clustered database. According to some embodiments, the first computer-executable instruction operable to identify a plurality of nodes associated with an application cluster comprises computer-executable instructions operable to detect an instance of the application cluster, query the instance to obtain an identification information of the application cluster, and query the instance to obtain identification of each of the nodes in the plurality of nodes.

In some embodiments, the computer-readable medium may comprise a fourth computer-executable instruction operable to use the identification information of each of the nodes to acquire a network address of each node in the plurality of nodes. According to at least one embodiment, the computer-readable medium may comprise a fifth computer-executable instruction operable to advertise the virtual node from each node in the plurality of nodes. In various embodiments, the third computer-executable instruction operable to provide a data backup module with access to at least one node in the plurality of nodes may comprise a computer-executable instruction operable to present virtual node of the application cluster module to the data backup server.

According to certain embodiments, a method may comprise detecting a clustered database, querying the clustered database to obtain identification information of the clustered database, and querying the clustered database to obtain identification information of each node associated with the clustered database. In certain embodiments, the method may comprise advertising a virtual node to a data protection server. The virtual node may comprise identification of each node associated with the clustered database.

According to some embodiments, each node associated with the clustered database may advertise the virtual node to the data protection server. In at least one embodiment, the method may further comprise using the identification information of each of the nodes to acquire a network address of each node in the plurality of nodes. According to some embodiments, the virtual node may comprise a virtual node name, the virtual node name comprising a name of the clustered database and an identification information of the clustered database. The virtual node may also comprise a network address of each node in the plurality of nodes.

The foregoing and other features, utilities, and advantages of the invention will be apparent from the following detailed description of the invention with reference to the accompanying drawings.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
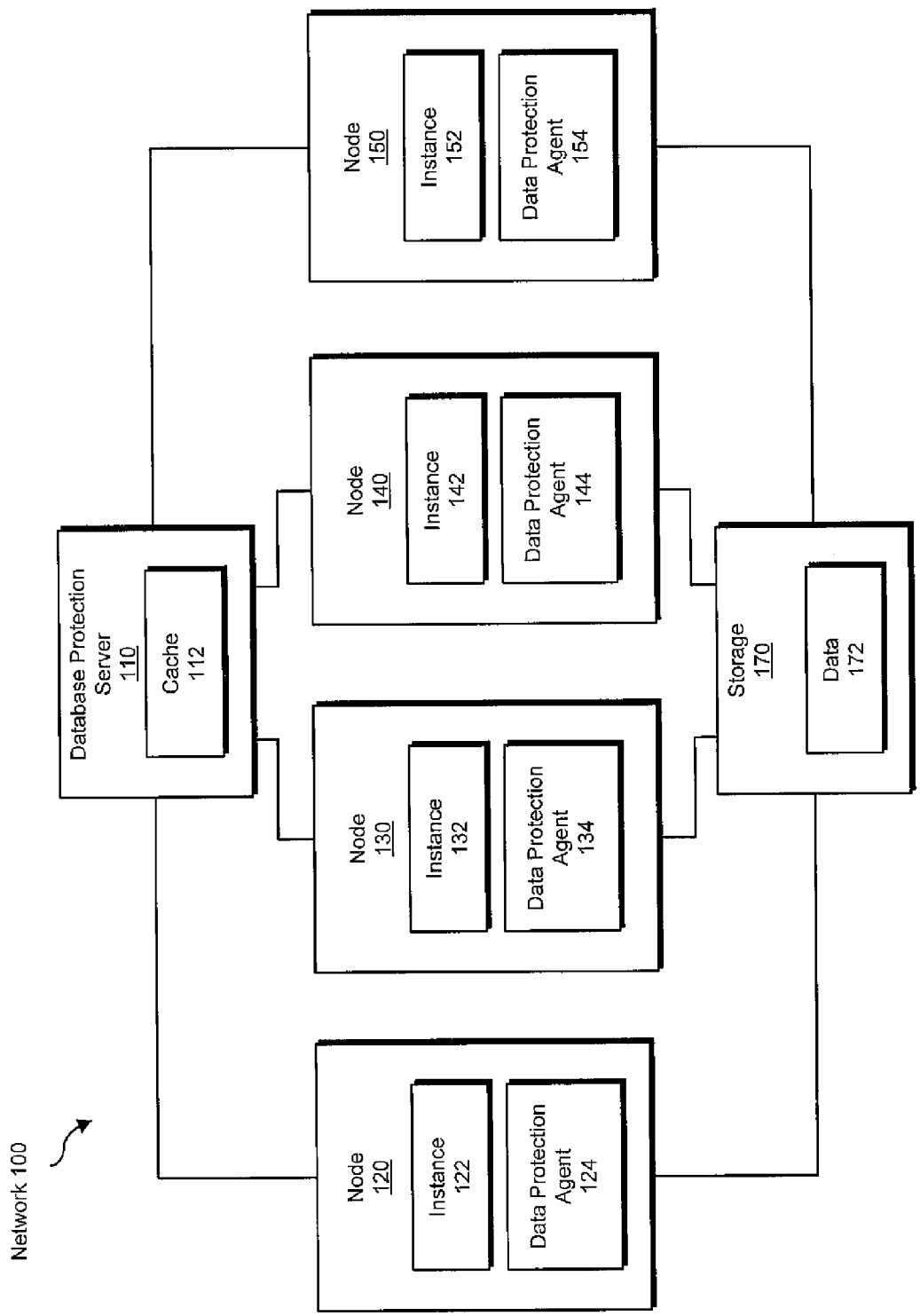
FIG. 1 is a block diagram of an exemplary network according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

The following is intended to provide a detailed description of various exemplary embodiments and should not be taken to be limiting in any way. Various exemplary methods and systems for creating and presenting virtual nodes are described and/or illustrated herein. Many of the embodiments presented herein discuss database and other data management systems; however, the principles of the instant disclosure apply to various other computer applications and systems. As discussed in greater detail below, embodiments of the instant disclosure may provide more efficient and reliable data management and protection.

Embodiments of the present disclosure may improve communication between a data protection module and an application cluster. A data protection module may be a module or application capable of backing up data, restoring data, repairing data, recovering data, and/or providing any other data protection function. An application cluster may be an application capable of being simultaneously accessed by multiple nodes. An example of an application cluster is a clustered database (e.g., ORACLE REAL APPLICATION CLUSTER). Protecting data associated with an application cluster may present several unique challenges.

An explanation of the nature of application clusters may provide insight into the challenges of protecting application cluster data. As previously noted, an application cluster may be a clustered database. A clustered database may allow database management software running on multiple computers to simultaneously access a single database. In other words, two or more computers, each with a database instance, may concurrently access a single database. As used herein, a computing device running an instance may be referred to as a node or a physical node. A node may be a computing device with an object, a module, or any other suitable access point for a data associated with an application cluster.

A clustered database may have many advantages over a non-clustered database. For example, a clustered database may provide high availability for the database. Also, data architects may be able to create database infrastructures without single points-of-failure by employing redundancy. Redundancy may reduce the chance that any set of simultaneous failures will cause a loss of connectivity to the database. Also, a clustered database may be more scalable that a single-instance database.

A clustered database may also have some disadvantages over other types of databases, particularly with respect to backing up the database. For example, a clustered database may be accessible through several nodes. A user may not realize that each of these nodes are connected to the same database and may select all the nodes for backup. As a result, data from the database may be backed up multiple times, which may waste time and resources. Furthermore, having multiple backup copies of the same database may create confusion for a network administrator during a restoration or recovery process.

In another example, a network administrator may select only a single node for backing up a database. If the selected node is inoperable, the backup operation may fail even if another node associated with the database is running and available. Another problem with backing up and restoring data in a clustered database is that cataloging of backup data is typically tied to the computer where the data lies. If a network administrator attempts to backup a clustered database from different nodes at different points in time and then presents them as one database under different nodes, users may become confused. Embodiments of the present disclosure may address one or more of these disadvantages and may provide various other features and advantages.

FIG. 1 illustrates a network 100. Network 100 may include a database protection server 110. Database protection server 110 may be any suitable database protection application or module and may run on any suitable computing and/or storage device. In some embodiments, database protection server 110 may be a media server. An application cluster may be any suitable application cluster, such as a clustered database. An application cluster may include several instances that run on different nodes. For example, an application cluster may include an instance 122, an instance 132, an instance 142, and an instance 152.

Database protection server 110 may be connected to a node 120, a node 130, a node 140, and a node 150. Nodes 120, 130, 140, and 150 may be connected to database protection server 110 and storage 170 and through a network. Storage 170 may be any suitable storage and/or computing device. Storage 170 may store data 172. Data 172 may be a database or any other suitable data structure or compilation of data.

Node 120 may include a data protection agent 124 and an instance 122 of the application cluster. Data protection agent 124 may be a backup agent, a restoration agent, a recovery agent, or any other suitable data protection application or module. Node 130 may include a data protection agent 134 and an instance 132 of the application cluster. Node 140 may include a data protection agent 144 and an instance 142 of the application cluster. Node 150 may include a data protection agent 154 and an instance 152 of the application cluster. Nodes 120, 130, 140, and 150 may provide access to data 172 on storage 170 through instances 122, 132, 142, and 152. Data protection agents 124, 134, 144, and 154 may be associated with data protection server 110.

Figure 2:
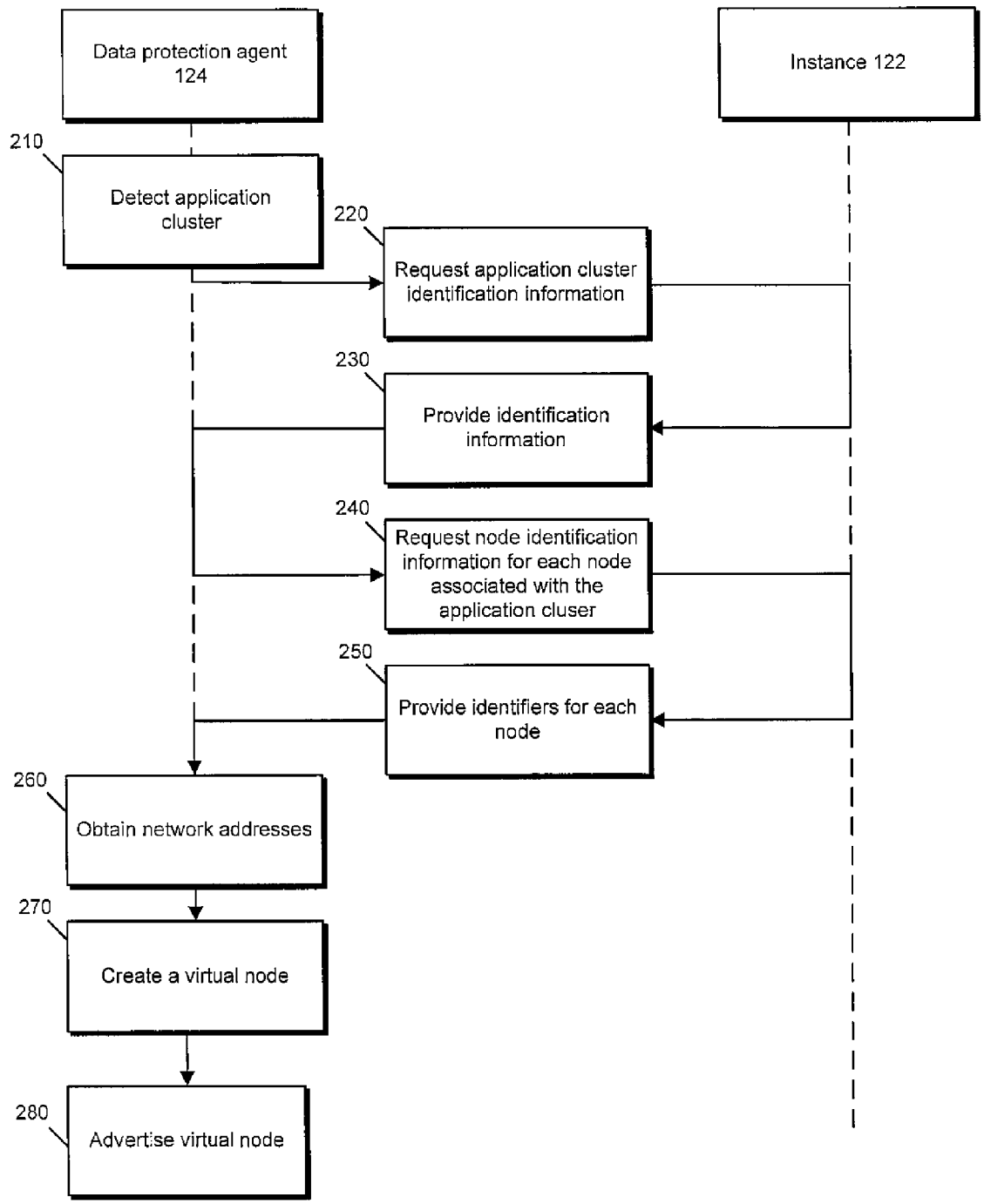
FIG. 2 is a flow diagram of exemplary communications between a data protection agent and an instance of a clustered application according to certain embodiments.

According to embodiments of the present disclosure, a virtual node may also provide access to the application cluster. A virtual node may optimize backup, restore, and other data protection functions performed on the data associated with an application cluster. FIG. 2 illustrates an exemplary process for creating and caching a virtual node.

FIG. 2 illustrates an exemplary method that results in the creation and caching of a virtual node. FIG. 2 shows various communications between data protection agent 124 and instance 122. First, data protection agent 124 may detect that it is running on a node of an application cluster (step 210). In other words, data protection agent 124 may detect that instance 122 is part of an application cluster. In some embodiments, data protection agent 124 may detect that the application cluster is a clustered database rather than a single-instance database.

After detecting the application cluster, data protection agent 124 may request application cluster identification information from instance 122 (step 220). In response, instance 122 may provide identification information to data protection agent 124 (step 230). Identification information may be a name of the application cluster, an identification number of the application cluster, and/or any other suitable identification information. After receiving the identification information, data protection agent 124 may request identification information of each node associated with the application cluster (step 240). A node may be referred to as being associated with an application cluster if the node is an access point for the application cluster. A node associated with an application cluster may also be referred to as a participating node. In some embodiments, steps 220 and 240 may be performed simultaneously. In other words, data protection agent 124 may request application cluster identification information and node identification information at the same time.

Instance 122 may provide node identification information for each participating node to data protection agent 124. In some embodiments (e.g., for an ORACLE REAL APPLICATION CLUSTER), the instance may already have identification information for each participating node.

Data protection agent 124 may obtain network addresses for each node associated with the application cluster (step 260). According to various embodiments, data protection agent 124 may obtain the network addresses by using the identification information for the node to find the network address. In other embodiments, data protection agent 124 may receive the network addresses of each of the nodes after requesting node identification information from instance 122. A network address may be an Internet Protocol (IP) address or any other suitable network address.

Figure 3:
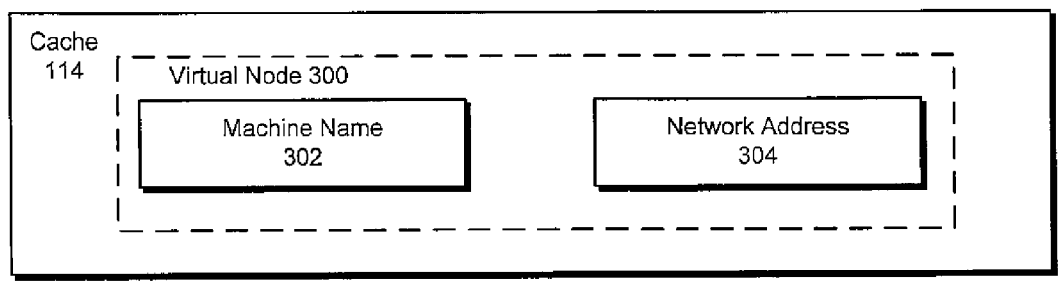
FIG. 3 is a block diagram of an exemplary virtual node in a cache according to certain embodiments.

After data protection agent 124 obtains network addresses for each node, data protection agent 124 may create a virtual node (step 270). A virtual node may be created by aggregating identification information for each node associated with an application cluster. For example, a virtual node for an application cluster may contain identification information for each of nodes 120, 130, 140, and 150. An example of a virtual node is illustrated in FIG. 3. After creating a virtual node, data protection agent 124 may advertise the virtual node to database protection server 110 (step 280). Database protection server 110 may then store the virtual node in cache 112. In some embodiments, a virtual node may be created by modifying, adding, or deleting steps shown in FIG. 2. According to various embodiments, data protection module 134, data protection module 144, and data protection module 154 may each create a virtual node by communicating with their respective instances. Thus, each of nodes 130, 140, and 150 may also create a virtual node by the same process described in FIG. 2.

FIG. 3 illustrates an exemplary virtual node 300 stored in cache 112. As shown, virtual node 300 may comprise a machine name 302 and network addresses 304. A machine name may include a name of an application cluster and an identification number of the application cluster. A machine name may also include any other suitable identification information. Network addresses 304 may include network addresses for each of nodes 120, 130, 140, and 150.

During the process of creating a virtual node, each of nodes 130, 140, and 150 may receive the same information (i.e., identification information for the application cluster and for the nodes associated with application cluster) from the instances of the application cluster. Thus, each node would create virtual nodes with the same information without any intra-node communication. In some embodiments, each time a node advertises a virtual node, database protection server 110 will overwrite the preexisting data in cache 112. In such embodiments it may be important for each node to advertise identification information for itself and every other node associated with the application cluster so that cache 112 will always have identification information for each participating node. By advertising a virtual node (e.g., identification information for all nodes associated with application cluster), the application cluster may be tied only to the virtual node rather than being tied to any specific physical node. This may ensure that the application cluster does not appear under each node for backup, recovery, or any other data protection operation.

Figure 4:
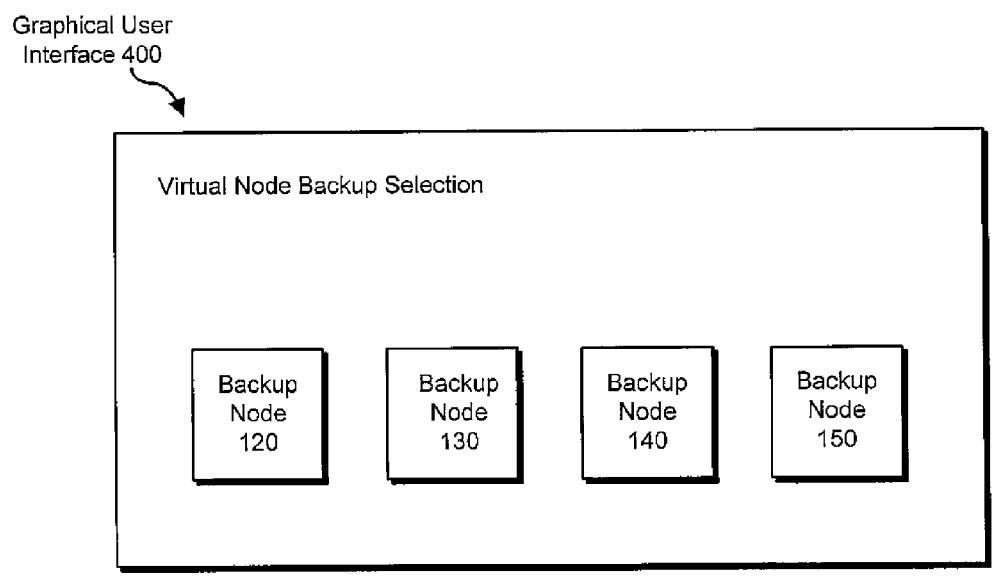
FIG. 4 is a block diagram of an exemplary graphical user interface according to certain embodiments.

Since the application cluster may not appear under physical nodes 120, 130, 140, or 150, when a backup of the application cluster is scheduled, each node will not perform the backup because only a single node (i.e., the virtual node) is presented to data protection server 110. Another advantage of using virtual nodes is that a data protection server may use the virtual node to identify each physical node associated with a virtual node and may present the physical nodes to a user for selection. The user may select which node to use when performing a data protection operation. Data protection operations may include backing up data, restoring data, recovering data, or any other suitable operation. FIG. 4 illustrates a graphical user interface 400 that may be presented to a user for node selection. Graphical user interface 400 may allow a user to select from the nodes associated with the application cluster (e.g., nodes 120, 130, 140, and 150). Thus, a virtual node reduces user confusion by enabling a data protection server to present an application cluster as a single virtual node with underlying physical nodes.

When an instance of the application cluster is down, the identification information for the node associated with the instance may no longer be advertised. For example, if instance 152 is down (e.g., data 172 is not accessible through instance 152), the virtual node may no longer contain a network address of node 150. Thus, if a data protection application attempts to backup data 172 of the application cluster through node 150 when instance 152 is down, the data protection module may select a different network address (i.e., a different node) from the virtual node and may attempt the backup again.

Figure 5:
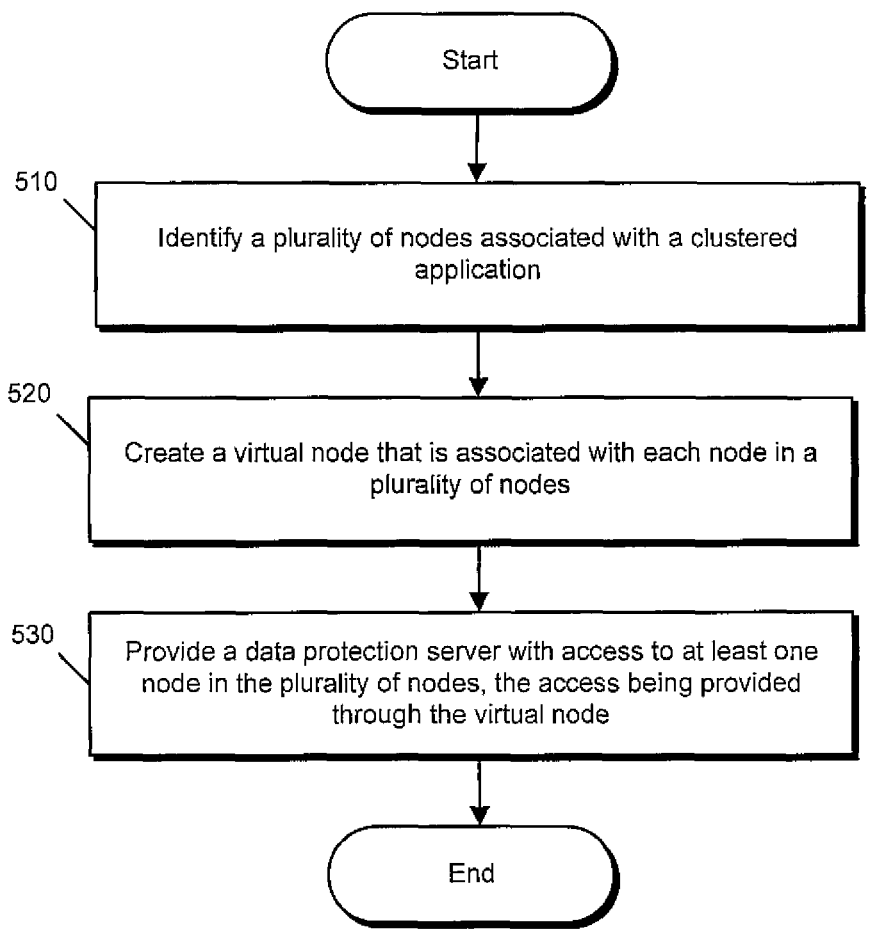
FIG. 5 is a flow diagram of an exemplary method of creating a virtual node according to certain embodiments.

FIG. 5 is a flow diagram showing the steps of creating a virtual node and providing access to other nodes through the virtual node. First, a data protection module may identify a plurality of nodes associated with an application cluster (step 510). After identifying the plurality of nodes associated with the application cluster, the data protection module may create a virtual node that is associated with each node in the plurality of nodes (step 520). In some embodiments, a module or application other than a data protection module may perform either or both of the identifying and creating steps. After the virtual node is created, the application cluster may provide a data protection server with access to at least one node in the plurality of nodes, the access being provided through the virtual node (step 530).

Figure 6:
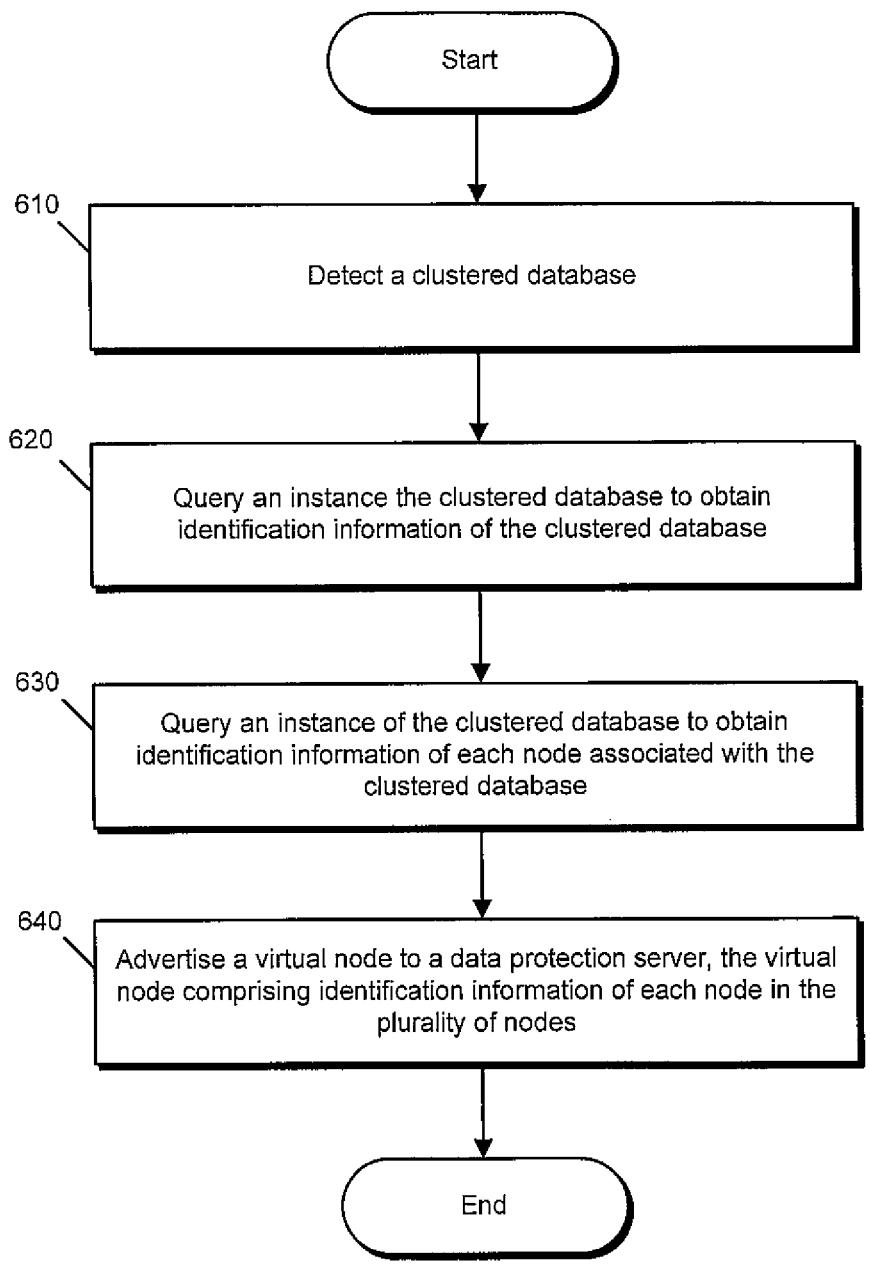
FIG. 6 is a flow diagram of an exemplary method of creating a virtual node for a database cluster.

FIG. 6 is a flow diagram illustrating exemplary steps of creating a virtual node for a clustered database. A data protection module may detect a clustered database (step 610) and query an instance of the clustered database to obtain identification information of the clustered database (step 620). An instance of the clustered database may be an instantiation of a database, and a clustered database may include multiple instances. The data protection module may also query the instance of the clustered database to obtain identification information of each node associated with the clustered database (step 630). The database protection module may advertise a virtual node to the data protection server (step 640), and the virtual node may comprise identification information of each node in the plurality of nodes.

Figure 7:
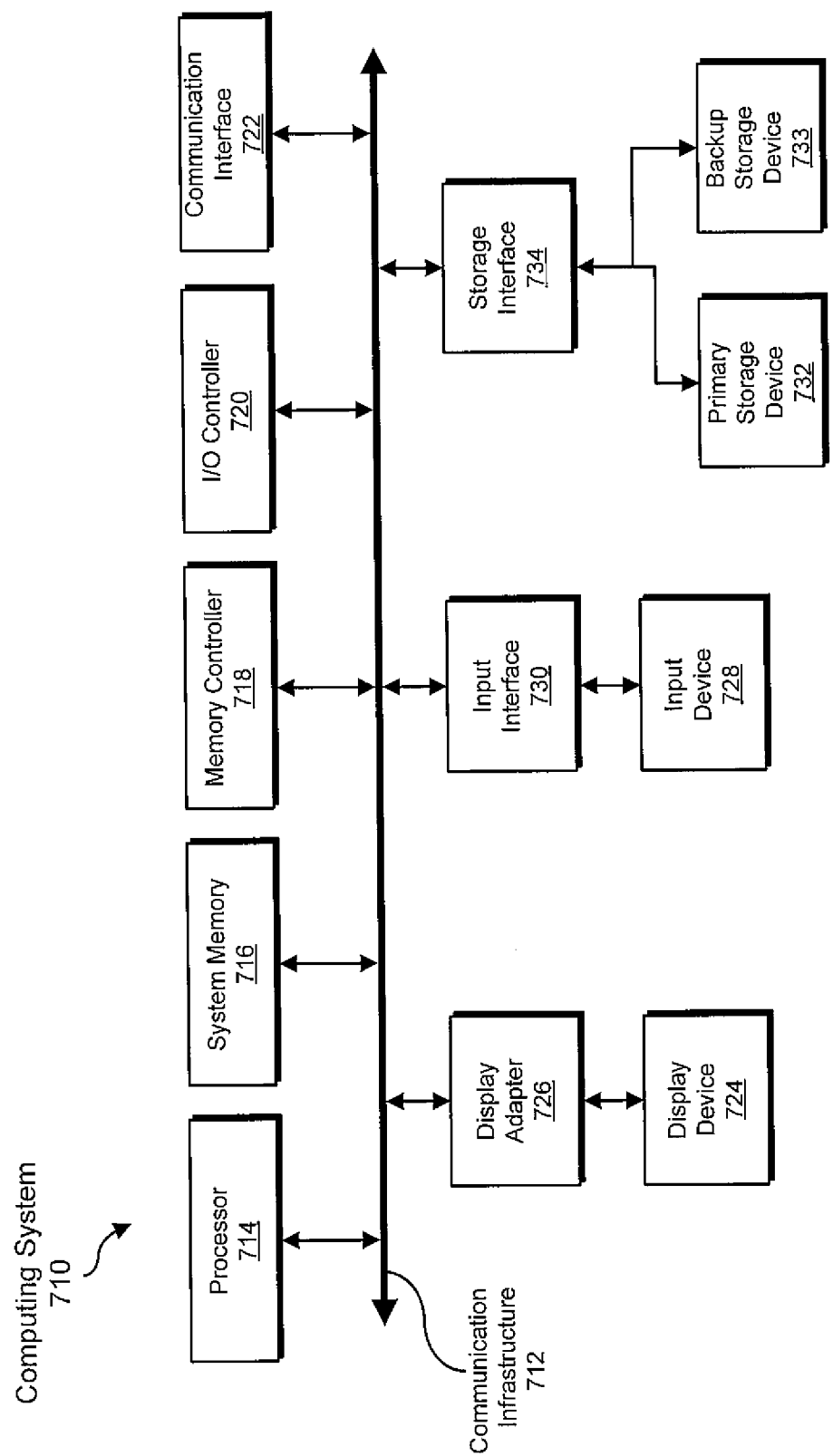
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, creating, storing, locating, restoring, copying, comparing, and retrieving steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing device 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 718, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, creating, providing, advertising, storing, detecting, querying, disassociating, and/or using.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, creating, providing, advertising, storing, detecting, querying, disassociating, and/or using steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, creating, providing, advertising, storing, detecting, querying, disassociating, and/or using steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, creating, providing, advertising, storing, detecting, querying, disassociating, and/or using steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 738. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 738 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, creating, providing, advertising, storing, detecting, querying, disasso-ciating, and/or using steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments descried and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device or medium capable of storing or carrying computer-readable instructions. Examples of computer-readable media include recordable media (such as floppy disks and CD- or DVD-ROMs), electronic-storage media, magnetic-storage media, optical-storage media, and other distribution systems.

The computer-readable medium containing the computer program may then be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
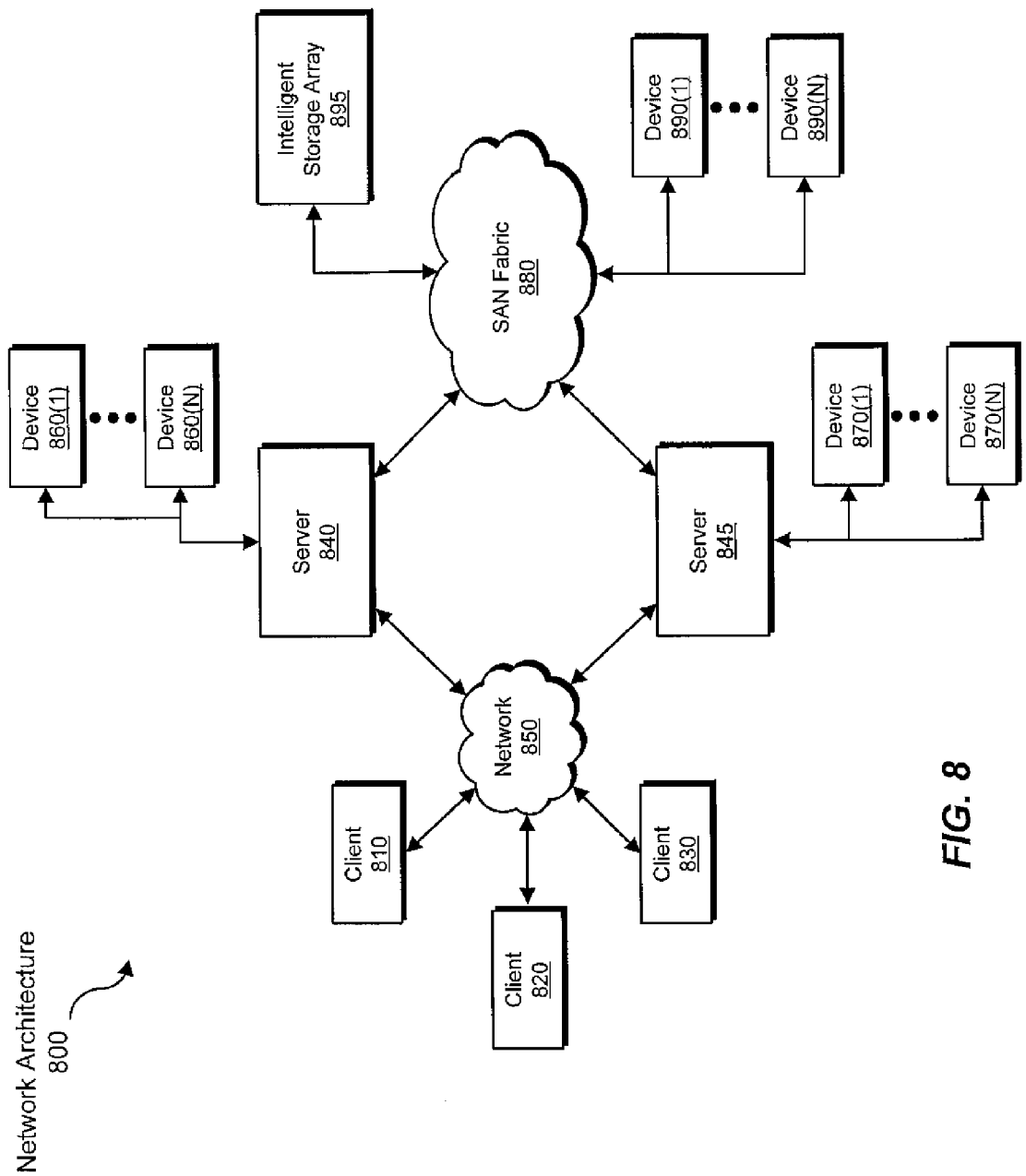
FIG. 8 is a block diagram of an exemplary computing system capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 850, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, creating, providing, advertising, storing, detecting, querying, disassociating, and/ or using steps disclosed herein. Network architecture 800 may also be used to perform and/or be a means for performing other steps and features set forth in the instant disclosure.

For example, in certain embodiments the exemplary file systems disclosed herein may be stored on client systems 810, 820, and/or 830. Similarly, the exemplary file-system backups disclosed herein may be stored on server 840, server 845, storage devices 860(1)-(N), storage devices 870(1)-(N), storage devices 890(1)-(N), intelligent storage array 895, or any combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting data in an application cluster, at least a portion of the method being performed by a computing device comprising at least one processor, the method comprising:
   identifying a plurality of physical nodes associated with an application cluster, wherein the application cluster comprises an application configured to be simultaneously accessed by two or more nodes from the plurality of physical nodes;
   creating a virtual node that is associated with each node in the plurality of physical nodes;
   advertising the virtual node to a data protection server by transmitting the virtual node to the data protection server, wherein the data protection server is configured to perform one or more data protection operations on data associated with the application cluster;
   caching the virtual node at the data protection server;
   providing the data protection server with access to at least one node in the plurality of physical nodes to perform a data protection operation on data stored by the application, the access being provided through the virtual node to provide the data protection server with a unified view of the data stored by the application.

2. The method of claim 1, wherein advertising the virtual node to the data protection server by transmitting the virtual node to the data protection server comprises transmitting the virtual node from each node within the plurality of physical nodes.

3. The method of claim 1, wherein caching the virtual node at the data protection server comprises overwriting a previously cached version of the virtual node.

4. The method of claim 1, wherein the application cluster comprises a clustered database, wherein the clustered database separately appears as a resource on each node within the plurality of physical nodes.

5. The method of claim 1, wherein identifying the plurality of physical nodes comprises:
    detecting an instance of the application cluster located on at least one of the plurality of physical nodes;
    querying the instance to obtain identification information of the application cluster;
    querying the instance to obtain identification information of each of the nodes in the plurality of physical nodes.

6. The method of claim 5, wherein creating the virtual node comprises:
    using the identification information of each of the nodes to acquire a network address of each node in the plurality of physical nodes;
    aggregating the network address of each node in the plurality of physical nodes.

7. The method of claim 1, wherein:
    each node in the plurality of physical nodes comprises a database protection agent;
    creating the virtual node comprises each data protection agent communicating with every other data protection agent;
    each data protection agent advertises the virtual node to the data protection server.

8. The method of claim 1, wherein each node in the plurality of physical nodes is given simultaneous access to data associated with the application cluster.

9. The method of claim 1, wherein providing further comprises presenting an application cluster database under the virtual node as a resource connected to the virtual node.

10. The method of claim 1, further comprising:
    disassociating a physical node from the virtual node when the physical node becomes unavailable by removing a network address of the physical node from the virtual node.

11. A computer-readable-storage medium comprising one or more computer-executable instructions that, when executed by a computing device including at least one processor, cause the computing device to:
    identify a plurality of physical nodes associated with an application cluster, wherein the application cluster comprises an application configured to be simultaneously accessed by two or more nodes from the plurality of physical nodes;
    create a virtual node that is associated with each node in the plurality of physical nodes;
    advertise the virtual node to a data protection server by transmitting the virtual node to the data protection server, wherein the data protection server is configured to perform one or more data protection operations on data associated with the application cluster;
    cache the virtual node at the data protection server;
    provide the data protection server with access to at least one node in the plurality of physical nodes to perform a data protection operation on data stored by the application, the access being provided through the virtual node to provide the data protection server with a unified view of the data stored by the application.

12. The computer-readable-storage medium of claim 11, wherein the application cluster comprises a clustered database.

13. The computer-readable-storage medium of claim 11, wherein the one or more computer-executable instructions, when executed by the computing device including at least one processor, further cause the computing device to:
    detect an instance of the application cluster located on at least one of the plurality of physical nodes;
    query the instance to obtain identification information of the application cluster;
    query the instance to obtain identification information of each of the nodes in the plurality of physical nodes.

14. The computer-readable-storage medium of claim 13, wherein the one or more computer-executable instructions, when executed by the computing device including at least one processor, further cause the computing device to use the identification information of each of the nodes to acquire a network address of each node in the plurality of physical nodes.

15. The computer-readable-storage medium of claim 11, wherein the one or more computer-executable instructions, when executed by the computing device including at least one processor, further cause the computing device to:
    advertise the virtual node from each node in the plurality of physical nodes.

16. The computer-readable-storage medium of claim 11, wherein the one or more computer-executable instructions, when executed by the computing device including at least one processor, further cause the computing device to present the virtual node to the data protection server.

17. A computer-implemented method for protecting data in an application cluster, at least a portion of the method being performed by a computing device comprising at least one processor, the method comprising:
    detecting a clustered database;
    querying the clustered database to obtain identification information of the clustered database;
    querying the clustered database to obtain identification information of each node in a plurality of physical nodes associated with the clustered database;
    creating a virtual node that is associated with each node in the plurality of physical nodes;
    advertising the virtual node to a data protection server by transmitting the virtual node to the data protection server, the virtual node comprising the identification information of each node in the plurality of physical nodes;
    caching the virtual node at the data protection server, wherein the data protection server is configured to perform one or more data protection operations on data associated with the clustered database;
    providing the data protection server with access to at least one node in the plurality of physical nodes to perform a data protection operation on the clustered database, the access being provided through the virtual node to provide the data protection server with a unified view of the clustered database.

18. The method of claim 17, wherein each node in the plurality of physical nodes advertises the virtual node to the data protection server.

19. The method of claim 17, further comprising:
    using the identification information of each of the nodes to acquire a network address of each node in the plurality of physical nodes.

20. The method of claim 17, wherein the virtual node comprises:
    a virtual node name, the virtual node name comprising a name of the clustered database and the identification information of the clustered database;

a network address of each node in the plurality of physical nodes.

\* \* \* \* \*